United States Patent [19]

Lue

[11] Patent Number: 5,036,895
[45] Date of Patent: Aug. 6, 1991

[54] WOOD COPYING MACHINE

[76] Inventor: Long J. Lue, No. 21, Yuh Jen Rd., Tien Hsin Li, Feng Yuan City, Taichung Hsien, Taiwan

[21] Appl. No.: 603,658

[22] Filed: Oct. 26, 1990

[51] Int. Cl.$^5$ .............................................. B27G 5/06
[52] U.S. Cl. ...................... 144/144 A; 144/134 R; 144/137; 144/144 R; 409/97; 409/110; 409/130; 409/137
[58] Field of Search ................... 144/2 R, 137, 136 R, 144/134 R, 144 R, 144 A; 409/93, 97, 86, 110, 124, 130, 137

[56] References Cited

U.S. PATENT DOCUMENTS

| | | | |
|---|---|---|---|
| 354,997 | 12/1886 | Albee | 144/144 A |
| 463,836 | 11/1891 | Hunzinger | 144/144 A |
| 4,260,001 | 4/1981 | DeMuynck | 144/144 R |

Primary Examiner—W. Donald Bray
Attorney, Agent, or Firm—Townsend and Townsend

[57] ABSTRACT

A copying machine has a sliding table slidable on a board. A pattern plate and a work piece are clamped on the sliding table by a clamping device. A cantilever arm is pivotally coupled on the board. A motor is fixed to the body. A casing is pivotally coupled to the arm by a pin. A shaft is rotatably supported on the casing and is driven by the motor via a belt. A roller and a tool are fixed to the shaft. When the tool contacts the work piece, the casing is caused to rotate away from the arm. The roller is caused to move gradually toward the pattern plate by a resilient force of the belt so that the tool can gradually machine the work piece and so that the tool will not be easily damaged.

6 Claims, 7 Drawing Sheets

WOOD COPYING MACHINE

BACKGROUND OF THE INVENTION

The present invention relates to a copying machine, and more particularly to a wood copying machine.

Generally, a wood copying machine includes a copy roller which follows a pattern plate or template, and a tool for machining a work piece to a shape identical to that of the pattern plate. For a conventional wood copying machine, the path of the tool is identical to the path of contact of the roller with the pattern plate. Normally, the tool of the copying machine is moved directly toward the work piece and has to machine the work piece no matter how thick and how wide the work piece is so that the tool is apt to be damaged by the simultaneous contacts of the roller to the pattern plate and the tool to the work piece.

The present invention has arisen to mitigate and/or obviate the afore-described disadvantages of the wood copying machine.

SUMMARY OF THE INVENTION

The primary objective of the present invention is to provide a wood copying machine in which the tool can gradually machine the work piece so that the tool will not be easily damaged.

In accordance with one aspect of the invention, there is provided a copying machine has a sliding table slidable on a board. A pattern plate and a work piece are provided on the sliding table and are clamped in place by a clamping device. A cantilever arm includes a body which has one end pivotally coupled to a post. The post is fixed on the board. A motor is coupled to the end of the body and a first pulley is fixed on an upper end of an axle of the motor. An actuator is fixed in a free end of the body. A frame is pivotally coupled to a front portion of the free end of the body by a first pin. A second pulley is fixed on an upper end of the first pin. The free end of the piston rod of the actuator is pivotally coupled to the frame for actuating the frame to rotate about the first pin. A casing has a corner area pivotally coupled to the frame by a second pin which is located at a corner area diagonally opposite to the first pin so that the casing is rotatable relative to the frame about the second pin. A shaft is rotatably and vertically supported on the casing. A third pulley is fixed on an upper end of the shaft. A roller and a tool are fixed to the shaft. A belt is coupled between the first pulley and the second pulley and between the second pulley and the third pulley respectively so that the roller and the tool are actuated to rotate by the motor. The frame and the casing are resiliently pulled together by the belt. When the roller and the tool move toward the pattern plate and the work piece, the tool contacts the work piece first so that the casing is caused to rotate away from the frame about the second pin against a resilient force of the belt. The roller is caused to move gradually toward the pattern plate by the resilient force of the belt so that the tool can gradually machine the work piece and so that the tool will not be easily damaged.

Further objectives and advantages of the present invention will become apparent from a careful reading of the detailed description provided hereinbelow, with appropriate reference to the accompanying drawings.

DETAILED DESCRIPTION OF THE INVENTION

Figure 1:
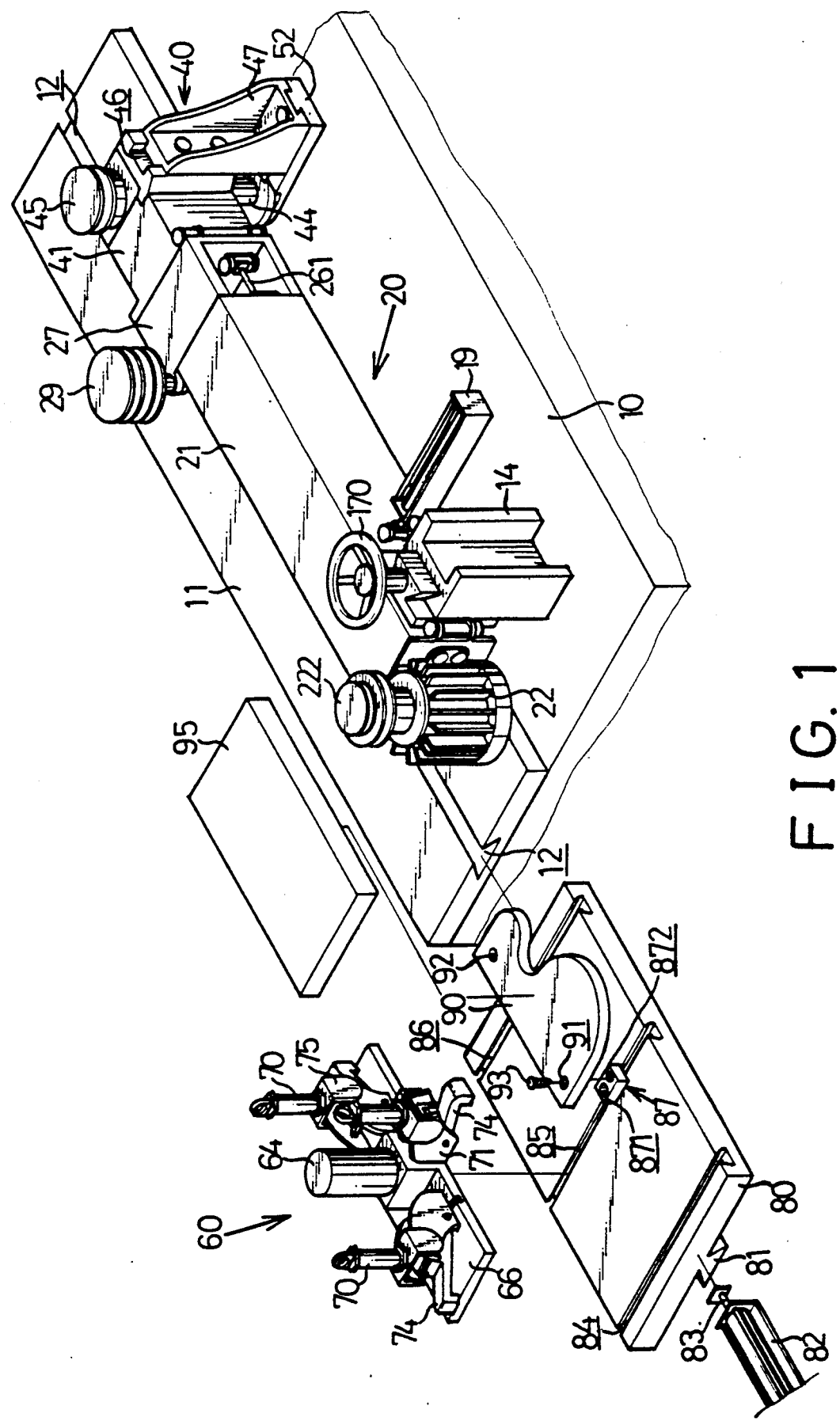
FIG. 1 is a partial perspective view of a wood copying machine in accordance with the present invention.
Figure 2:
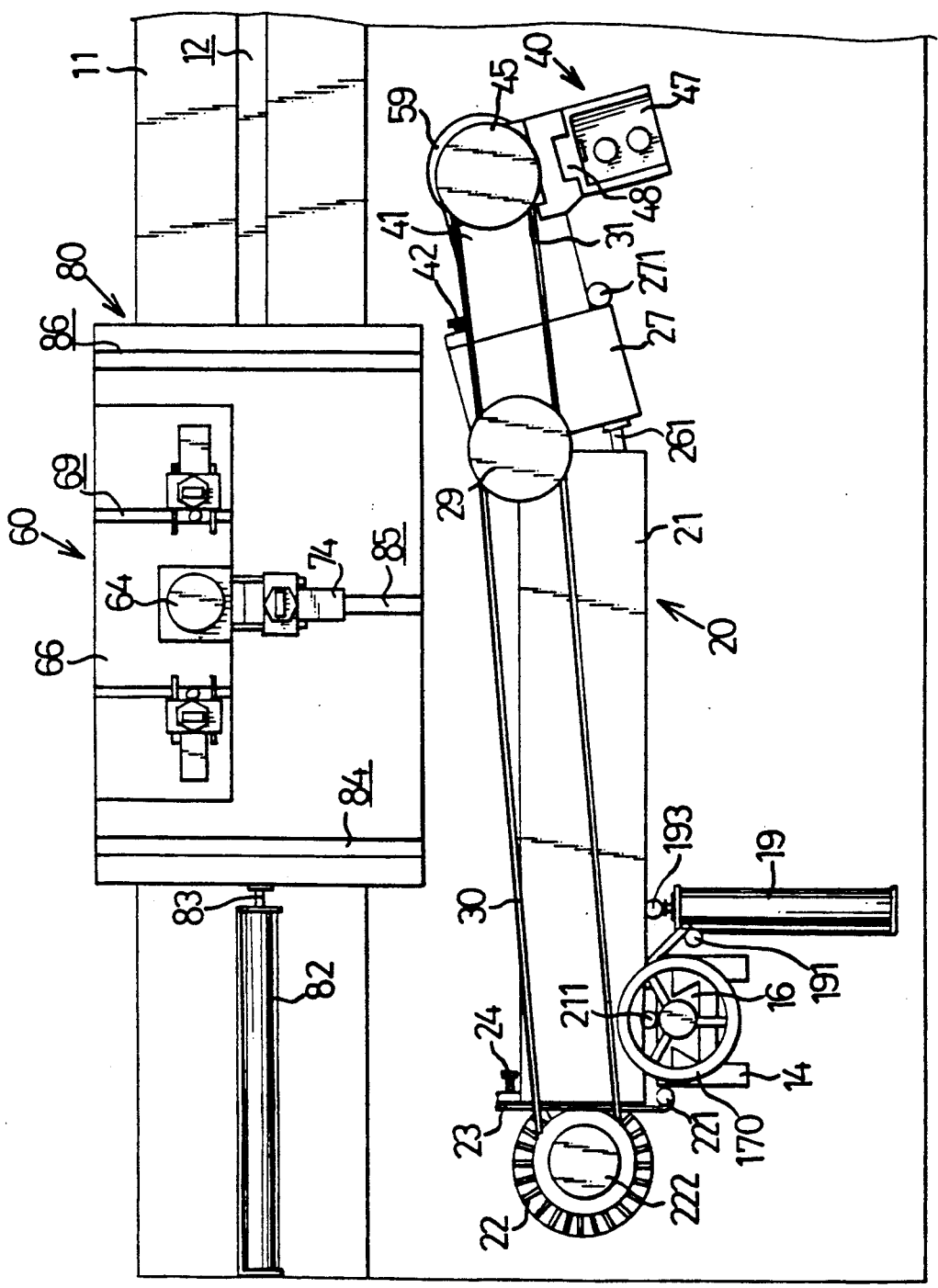
FIG. 2 is a top plane view of the copying machine.

Referring to the drawings and initially to FIGS. 1 and 2, the wood copying machine in accordance with the present invention comprises generally a cantilever beam 20 pivotally coupled to a post 14 which is disposed on a working table 10, a head 40 disposed on the free end of the cantilever beam 20, and a clamping device 60 disposed on a sliding table 80 for clamping a pattern plate 90 and a work piece 95. The post 14 is vertically fixed on the working table 10. A dovetail groove 12 is longitudinally formed in the middle portion of a board 11 which is longitudinal and which is disposed on the front portion of the working table 10. The sliding table 80 is slidable along a track which is formed by the dovetail groove 12.

Figure 3:
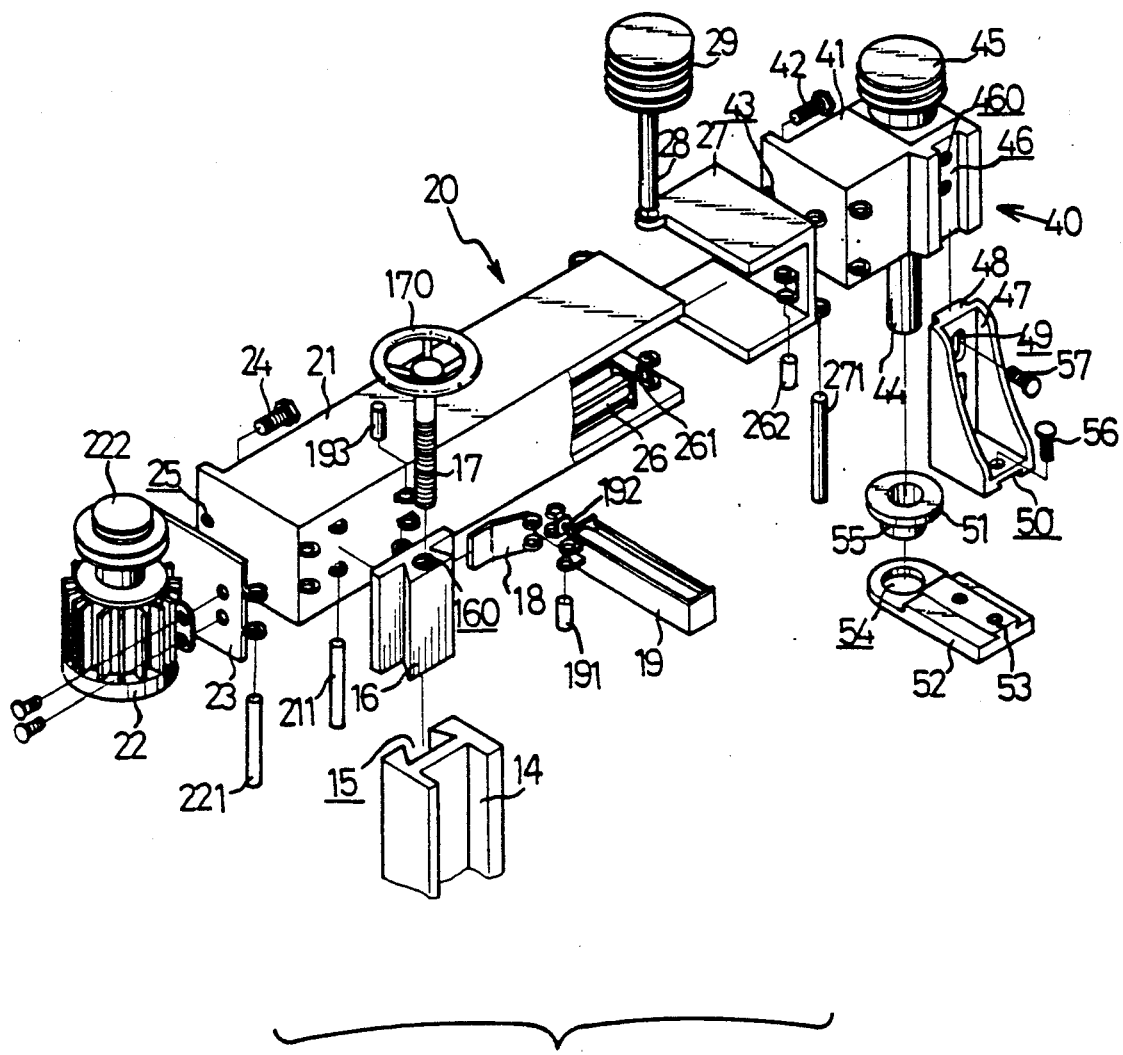
FIG. 3 is an exploded view of the cantilever beam of the copying machine.

Referring next to FIG. 3 and again to FIGS. 1 and 2, a dovetail slot 15 is formed on the front side of the post 14 for receiving a dovetail slide 16. A screw hole 160 is longitudinally formed through the dovetail slide 16. A bolt 17 is threadedly engaged with the screw hole 160. A handle portion 170 is provided on the upper end of the bolt 17 for facilitating the rotation of the bolt 17. The lower end of the bolt 17 extends beyond the dovetail slide 16 and contacts the table surface of the working table 10. The rotation of the bolt 17 causes the dovetail slide 16 to move up and down by the engagement between the dovetail slide 16 and the dovetail slot 15. A lug 18 is laterally fixed to the front surface of the dovetail slide 16 by such as welding. The front end of an actuator 19 is pivotally coupled to the free end of the lug 18 by a pin 191.

The cantilever beam 20 includes a body 21 which has one end portion of a rear surface pivotally coupled to the front surface of the dovetail slide 16 by a pin 211 so that the body 21 is supported in a cantilever type. The front end of a piston rod 192 of the actuator 19 is pivotally coupled to the middle portion of the rear surface of the body 21 by a pin 193 so that the body 21 can be caused to rotate about the pin 211 by the actuator 19. A motor 22 is fixed to a plate 23 which has a rear edge pivotally coupled to the body 21 by a pin 221. A pulley 222 is coupled to the upper end of the axle of the motor 22. A screw 24 is threadedly engaged within a screw hole 25 which is formed in the front and left portion of the body 21. The screw 24 extends through the screw hole 25 and contacts the plate 23 so that the angular positions of the motor 22 and the plate 23 about the pin 221 can be determined by the extension of the screw 24 beyond the screw hole 25 (best shown in FIG. 2). An actuator 26 is disposed in the right end portion of the body 21. The piston rod 261 of the actuator 26 is extendible beyond the right end of the body 21. A frame 27 has a corner pivotally coupled to the right and front corner of the body 21 by a pin 28. A pulley 29 is fixed to the upper end of the pin 28. The piston rod 261 of the actuator 26 is pivotally coupled to the rear end of the frame 27 by a pin 262 so that the frame 27 can be caused to rotate about the pin 28 by the actuator 26.

The head 40 includes a casing 41 which has one corner pivotally coupled to the right and rear corner of the frame 27 by a pin 271. A screw 42 is threadedly engaged within a screw hole 43 which is formed in the front and left portion of the casing 41. The screw 42 extends through the screw hole 43 and contacts the frame 27 so that the angular positions of the casing 41 relative to the frame 27 about the pin 271 can be determined by the extension of the screw 42 beyond the screw hole 43 (best shown in FIG. 2). A shaft 44 is rotatably and vertically supported on one end of the casing 41. A pulley 45 is disposed on the upper end of the shaft 44. A channel 46 is formed on the rear surface of the casing 41. Two screw holes 460 are formed in the channel 46. A holder 47 has a rib 48 formed on the front end thereof for sliding engagement within the channel 46 of the casing 41 so that the holder 47 is slidable up and down. Two oblong holes 49 are formed in the front wall of the holder 47 so that the holder 47 can be fixed to the casing 41 by such as screws 57. A dovetail groove 50 is formed in the bottom of the holder 47. A collar 51 is coupled to the shaft 44. A base 52 has a dovetail 53 formed on the upper surface thereof and is slidably received in the dovetail groove 50. The base 52 and the holder 47 can be fixed together by such as screws 56. An aperture 54 is formed in the front end of the base 52 for receiving a stub 55 formed on the lower end of the collar 51. The base 52 and the holder 47 are provided to hold the lower end of the shaft 44.

Figure 4:
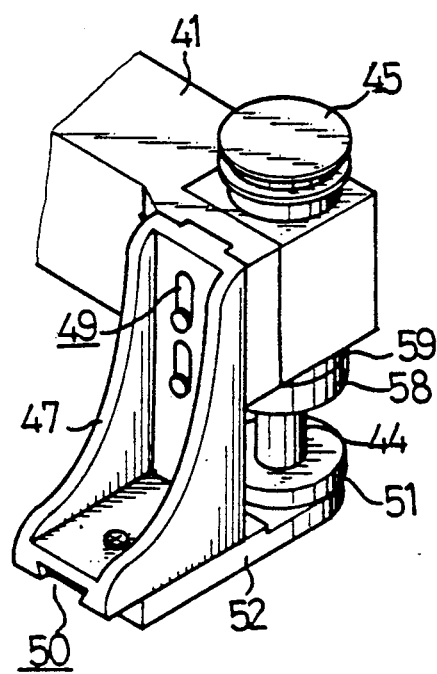
FIG. 4 is a perspective view of the roller and tool of the copying machine.

Referring next to FIG. 4, a roller 58 and a tool 59 are fixed on the shaft 44 so that they rotate in concert with the shaft 44 and the pulley 45. As shown in FIG. 2, a belt 30 is coupled between the pulleys 222 and 29 so that the pulley 29 is driven to rotate by the motor 22. A belt 31 is coupled between the pulleys 29 and 45 so that the pulley 45 and the roller 58 and the tool 59 can be driven to rotate by the motor 22. The motor 22 is resiliently pulled toward the body 21 by the belt 30. The screw 24 can adjust the relative position between the motor 22 and the body 21 so that the tension of the belt 30 can be adjusted. Similarly, the screw 42 can adjust the relative position between the frame 27 and the casing 41 so that the tension of the belt 31 can be adjusted. The piston rod 261 of the actuator 26 can push the frame 27 and the head 40 to rotate about the pin 28 so that the roller 58 and the tool 59 can be caused to move toward the board 11.

Figure 5:
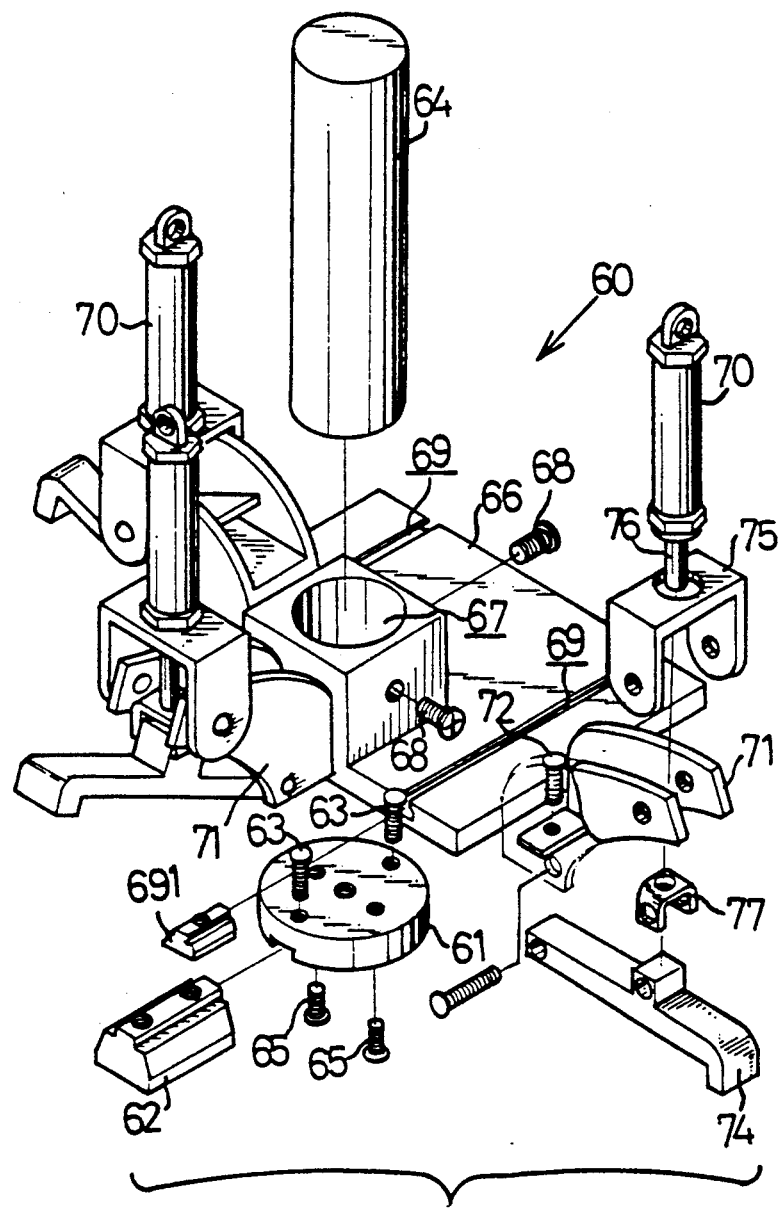
FIG. 5 is an exploded view of the clamping device.

Referring next to FIGS. 5 and 6, and again to FIGS. 1 and 2, a dovetail 81 is integrally formed on the bottom of the sliding table 80 and is slidably received in the dovetail groove 12 of the board 10. An actuator 82 is fixed on the left end of the board 11. The free end of a piston rod 83 of the actuator 82 is fixed to the left end of the sliding table 80 so that the sliding table 80 can be caused to move along the dovetail groove 12 by the actuator 82. Three dovetail slots 84, 85, 86 which are perpendicular to the longitudinal direction of the sliding table 80 are formed in the upper surface of the sliding table 80. A tongue 88 is slidably received in each of the slots 84, 85, 86. A block 87 which has two screw holes 871, 872 formed therein is fixed to each of the tongues 88 by a screw 89 which is threaded through the screw hole 871. Two holes 91, 92 are formed in the pattern plate 90 so that the pattern plate 90 can be fixed to the blocks 87 by screws 93 which are threadedly engaged with the screw holes 872 of the blocks 87. The blocks 87 are rotatable about the respective screw 89 so that the pattern plate 90 can be fixed to the blocks 87 when the holes 91, 92 of the pattern plate 90 are not drilled at the exact positions. The work piece 95 is directly disposed on the pattern plate 90.

Figure 6:
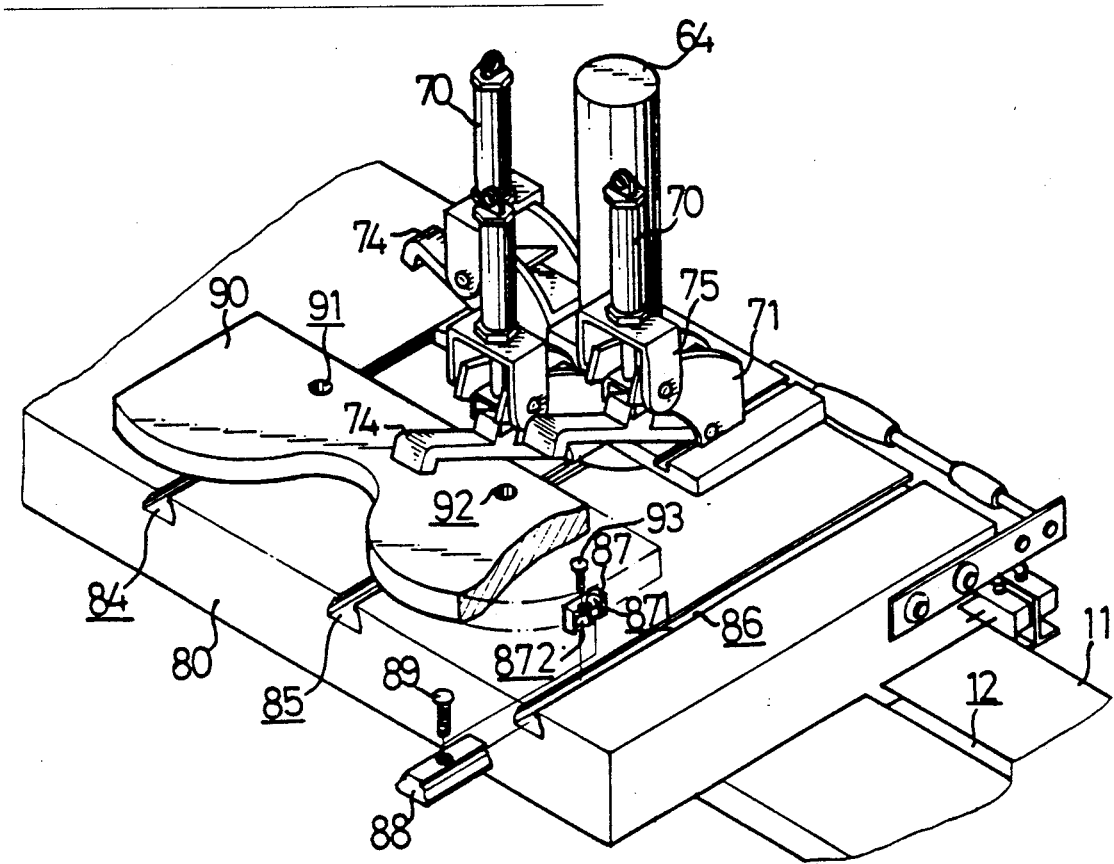
FIG. 6 is a partial perspective view of the clamping device for clamping a pattern plate and a work piece.

The clamping device 60 includes a disc 61 which is fixed to the upper end of a tenon 62 by screws 63. The tenon 62 is slidably received in the dovetail slot 85 of the sliding table 80. The disc 61 is fixed to the bottom of a column 64 by screws 65. A seat 66 has an opening 67 formed therein for receiving the column 64 so that the seat 66 is vertically slidable along the column 64. The seat 66 can be fixed to the column 64 at a suitable position by the screws 68. Two dovetail slots 69 are formed in the upper surface of the seat 66. A tongue 691 is slidably received in each of the slots 69. The clamping device 60 also includes three cylinders 70 each supported by a bracket 71. A middle bracket 71 is directly fixed to the seat 66. A bottom of each of the other two brackets 71 is fixed to the tongue 691 by a screw 72 so that the brackets 71 are movable along the slots 69 and are rotatable about the respective screws 72 (FIG. 6). A rear end of a lever arm 74 is pivotally coupled to the bottom of each of the brackets 71. An inverted U-shaped bracing plate 75 is pivotally coupled to the upper end of each of the brackets 71. The cylinders 70 are disposed on the respective bracing plates 75. The lower end of the piston rod 76 of each of the cylinders 70 is extendible beyond the bracing plate 75 and is pivotally coupled to the middle portion of each of the lever arms 74 by a coupling element 77 so that the lever arms 74 can be caused to rotate about the rear end thereof by the cylinders 70 and so that the free end of each of the lever arms 74 can be caused to move up and down in order to clamp the pattern plate 90 and the work piece 95 in place.

Figure 7:
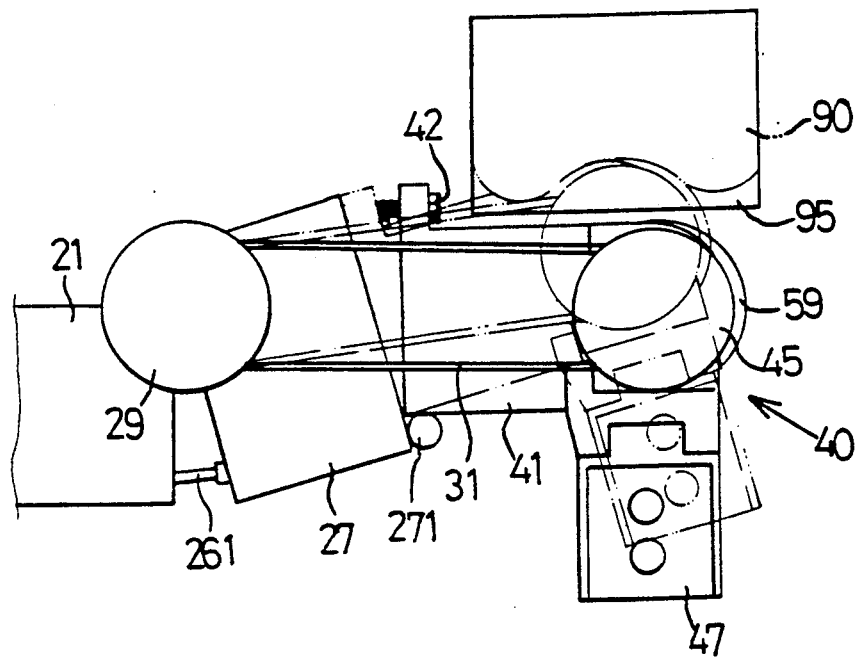
FIG. 7 is a schematic view of the tool portion, illustrating a working state of the copying machine.

Referring next to FIG. 7, when the sliding table 80 and the pattern plate 90 and the work piece 95 are pushed toward the head 40, and when the roller 58 and the tool 59 of the head 40 is caused to move toward the pattern plate 90 and the work piece 95 by the actuation of the actuators 19 and 26, the tool 95 will contact the work piece 95 first. At this moment, the casing 41 of the head 40 is caused to rotate away from the frame 27 about the pin 271 against the resilient force of the belt 31, and the roller 58 is caused to move gradually toward the pattern plate 90 by the resilient force of the belt 31 so that the tool can gradually machine the work piece 95 so that the tool will not be easily damaged.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A copying machine comprising:
   a board disposed on a front portion of a working table, a first groove being longitudinally formed in a middle portion of said board, a post vertically fixed on a rear portion of said working table;

a sliding table having a first tenon formed in a lower surface thereof and received in said first groove of said board so that said sliding table is slidable longitudinally along said board;

a first actuator being fixed on said working table, a free end of a piston rod of said first actuator being fixed to said sliding table for actuating said sliding table to slide along said board;

a pattern plate and a work piece being provided on said sliding table;

a clamping device being disposed on said sliding table, said clamping device having at least one lever arm which is actuated by a second actuator so that a free end thereof is actuated to move up and down in order to clamp said pattern plate and said work piece in place;

a cantilever arm including a body having a first end pivotally coupled to said post, a motor being coupled to said first end of said body, a first pulley being fixed on an upper end of an axle of said motor, a third actuator being fixed on said working table, a free end of a piston rod of said third actuator being coupled to a middle portion of said body for actuating said body to rotate, a fourth actuator being fixed in a second end of said body and having a piston rod extendible beyond said second end of said body, a frame having a corner area pivotally coupled to a front portion of said second end of said body by a first pin, a second pulley being fixed on an upper end of said first pin, said free end of said piston rod of said third actuator being pivotally coupled to said frame for actuating said frame to rotate about said first pin, a casing being pivotally coupled to said frame by a second pin which is located at a corner area diagonally opposite to said first pin so that said casing is rotatable relative to said frame about said second pin, a shaft being rotatably and vertically supported on said casing, a third pulley being fixed on an upper end of said shaft, a roller and a tool being fixed in a middle portion of said shaft so as to rotate in concert with said third pulley, a first belt being coupled between said first pulley and said second pulley and a second belt being coupled between said second pulley and said third pulley so that said roller and said tool are actuated to rotate by said motor, said frame and said casing being resiliently pulled together by said second belt; and when said sliding table and said tool and said pattern plate move toward said casing, and when said roller and said tool are actuated to move toward said pattern plate and said work piece by said third actuator and said fourth actuator, said tool first contacting said work piece so that said casing is caused to rotate away from said frame about said second pin against a resilient force of said second belt, said roller being caused to move gradually toward said pattern plate by said resilient force of said second belt so that said tool can gradually machine said work piece so that said tool will not be easily damaged.

2. A copying machine according to claim 1, wherein a dovetail slot is formed in a front surface of said post for receiving a dovetail slide, said cantilever beam is pivotally coupled to a front surface of said dovetail slide, a screw hole is formed through said dovetail slide for engagement with a bolt, a handle portion is provided on an upper end of said bolt for facilitating a rotation of said bolt, a lower end of said bolt extends beyond said dovetail slide and contacts a table surface of said working table, and said rotation of said bolt causes said dovetail slide to move up and down by an engagement between said dovetail slide and said dovetail slot so that said cantilever beam can be adjusted up and down.

3. A copying machine according to claim 1, wherein a screw hole is formed in one side of a contacting surface of said casing to said frame opposite to said second pin, a screw is threadedly engaged within said screw hole and extends through said screw hole and contacts said frame so that an angular position of said casing relative to said frame about said second pin can be determined by a rotation of said screw.

4. A copying machine according to claim 1, wherein a channel is formed on a rear surface of said casing, a holder has a rib formed on a front end thereof for sliding engagement within said channel so that said holder is slidable up and down relative to said casing and can be fixed to said casing by a screw, a dovetail groove is formed in a bottom of said holder, a collar is coupled to a lower end of said shaft, a base has a second tenon formed on an upper surface thereof and slidably received in said dovetail groove so that said base is slidable relative to said casing and can be fixed to said casing by a screw, an aperture is formed in a front end of said base for receiving a stub which is formed on a lower end of said collar, said base and said holder are provided to hold said lower end of said shaft so that said shaft can be rotatably supported in place.

5. A copying machine according to claim 1, wherein three dovetail slots which are perpendicular to a longitudinal direction of said sliding table are formed in an upper surface of said sliding table, a tongue is slidably received in each of said dovetail slots, a block has two screw holes formed therein is fixed to each of two outer tongues by a screw which is threaded through one of said screw holes, two holes are formed in said pattern plate so that said pattern plate can be fixed to said blocks by screws which are engaged within said holes and are threadedly engaged with the other screw holes of said blocks, said blocks are rotatable about said screws so that said pattern plate can be fixed to said blocks when said holes of said pattern plate are not drilled at the exact positions.

6. A copying machine according to claim 5, wherein a column is fixed on a tongue which is slidable in a middle one of said dovetail slots, a seat has an opening formed therein for engagement with said column so that said seat is vertically slidable along said column, at least two brackets are provided on said seat, one end of a lever arm is pivotally coupled to a bottom of each of said brackets, a cylinder is invertedly disposed on each of said brackets, a lower end of a piston rod of each of said cylinders is pivotally coupled to a middle portion of each of said lever arms so that said lever arms can be caused to rotate and so that a free end of each of said lever arms can be caused to move up and down in order to clamp said pattern plate and said work piece in place.

* * * * *